March 21, 1944. F. A. GILL 2,344,812
HEATING APPARATUS
Filed Nov. 18, 1942 3 Sheets-Sheet 2
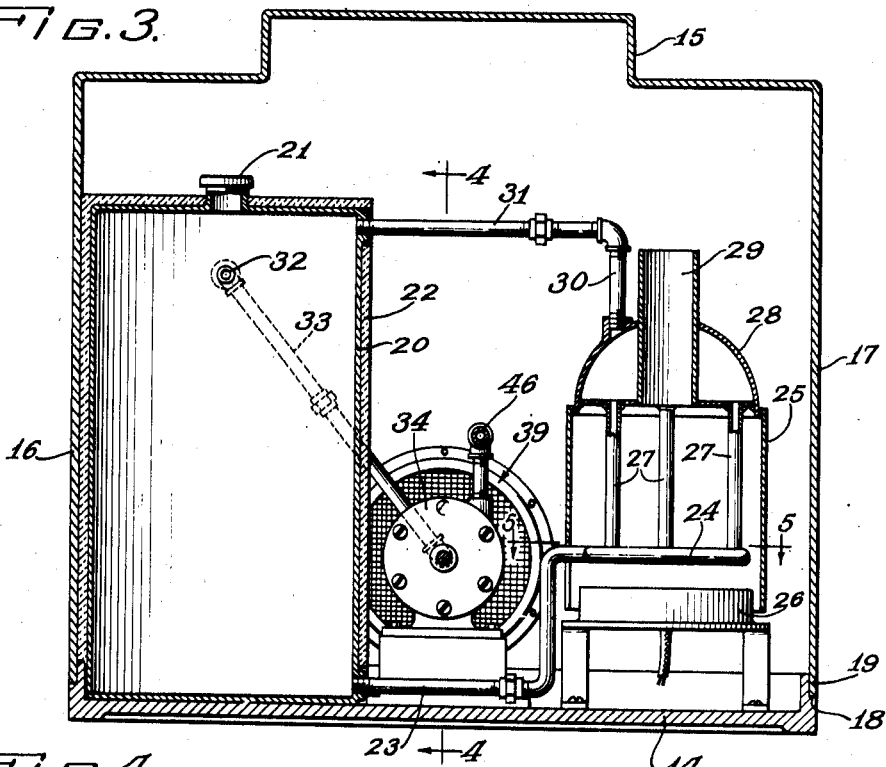
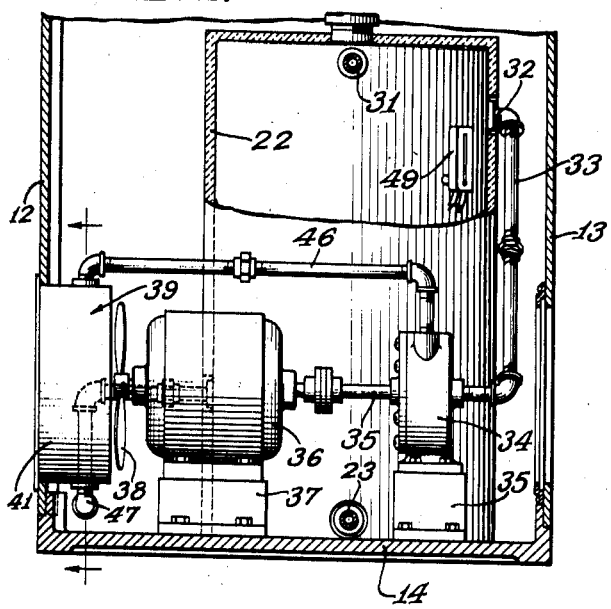
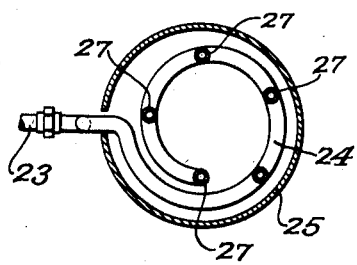
Inventor:
Ferdinand A. Gill
By Wallace and Cannon
Attorneys March 21, 1944. F. A. GILL 2,344,812
HEATING APPARATUS
Filed Nov. 18, 1942 3 Sheets-Sheet 3
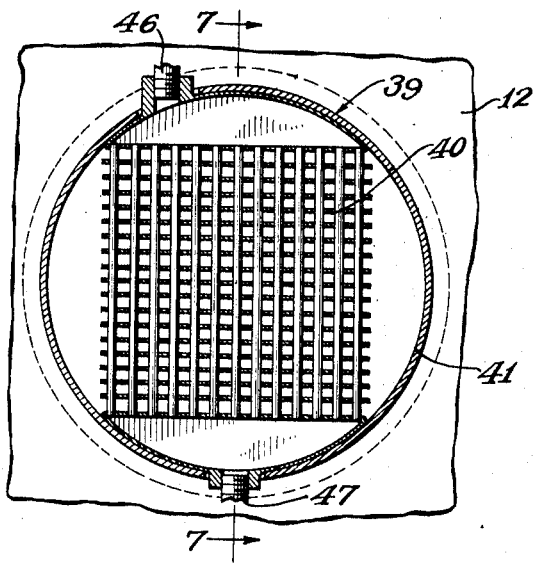
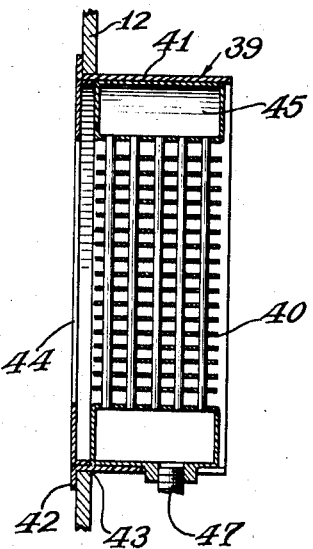
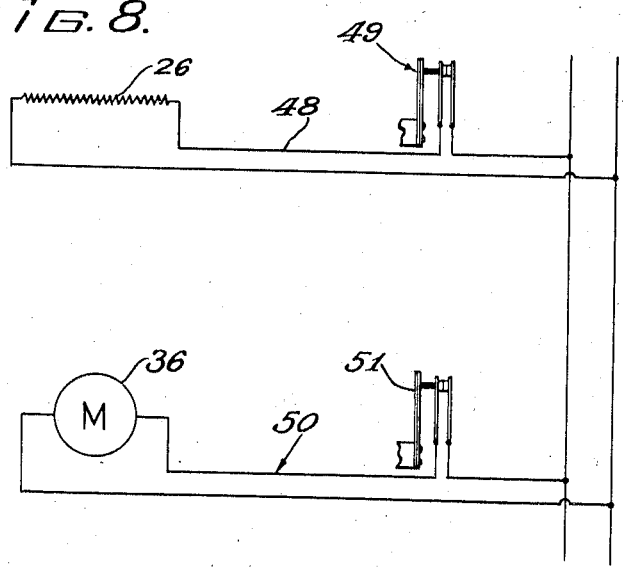
Inventor:
Ferdinand A. Gill
By Wallace and Cannon
Attorneys Patented Mar. 21, 1944

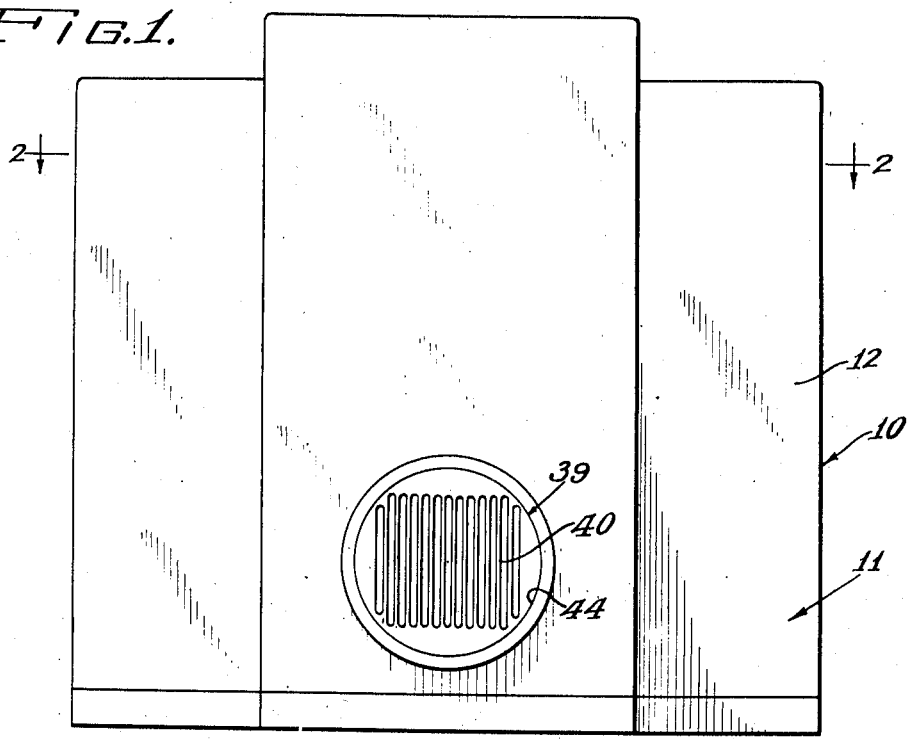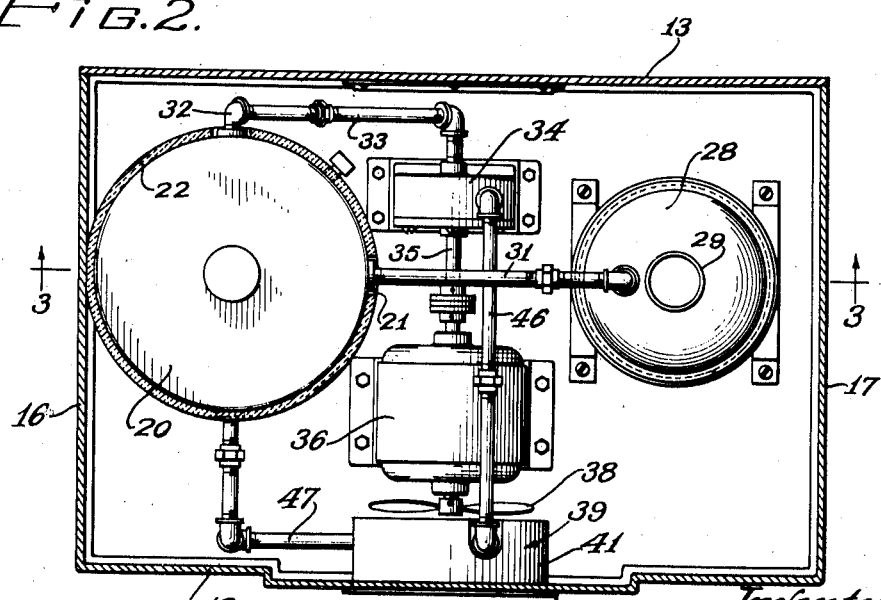

2,344,812

UNITED STATES PATENT OFFICE 2,344,812

HEATING APPARATUS

Ferdinand A. Gill, Chicago, Ill.

Application November 18, 1942, Serial No. 465,987

1 Claim. (Cl. 219—39)

This invention relates to a heating apparatus.

More specifically, this invention relates to a portable heating apparatus which is particularly adapted for use in heating small residences, cottages, small garages, individual rooms in residences and apartments, and the like.

The primary object of the invention is to provide a novel, compact, portable heating apparatus which is relatively simple and inexpensive in construction, and relatively economical in operation, and which may be employed for heating small residences, cottages, small garages, individual rooms in residences and apartments, and the like.

Other and further objects of the present invention will be apparent from the following description and claims and will be understood by reference to the accompanying drawings which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claim.

In the drawings,

Fig. 1 is a front elevational view of a preferred form of the new portable heating apparatus;

Fig. 2 is a sectional top plan view thereof on line 2—2 in Fig. 1;

Fig. 3 is a central vertical sectional view on line 3—3 in Fig. 2;

Fig. 4 is a view on line 4—4 in Fig. 3, partly in vertical section and partly in side elevation, and illustrating the arrangement of certain of the parts embodied in the new portable heating apparatus;

Fig. 5 is a fragmentary sectional top plan view, on line 5—5 in Fig. 3, illustrating a suitable form of a liquid heating unit which may be embodied in the new portable heating apparatus;

Fig. 6 is an enlarged view partly in section and partly in elevation, and illustrating a preferred embodiment of a heat radiator or heat-radiating unit embodied in the new portable heating apparatus;

Fig. 7 is a vertical sectional view on line 7—7 in Fig. 6; and

Fig. 8 is a diagrammatic view illustrating a preferred arrangement of the thermostatic controls for the electric operating motor and the electric heating unit embodied in the new portable heating apparatus.

A preferred form of the new portable heating apparatus is illustrated in the drawings, wherein it is generally indicated at 10, and comprises a relatively small, compact and portable housing 11, which may be of any suitable and pleasing shape and design so as to provide an attractive piece of furniture in residences, apartments and like places where the new portable heating apparatus may be used.

The housing 11 includes a front wall 12, a rear wall 13, which may be provided with a suitable door or like opening (not shown), a bottom wall 14, a top wall 15, and side or end walls 16 and 17. The side or end walls 16 and 17, the front wall 12, the rear wall 13 and the top wall 15 are preferably formed integrally with each other, or are joined together, so that they may be inserted into and removed from position of use as a unit. To this end the bottom wall 14 is preferably provided with a circumferentially extending rabbet or groove 18 which is adapted to receive and mate with the complementary lower end portion 19 of the removable unitary casing which is formed by the side walls 16 and 17, top wall 15, front wall 12 and rear wall 13.

The new portable heating apparatus or unit includes a metallic liquid reservoir or container 20 which is arranged in the housing 11 and is shown as being cylindrical in shape but may be square or otherwise rectangular in shape so as to fill the available space in the housing 11. The reservoir or container 20 is adapted to contain, and to have stored therein, any suitable liquid having good heat-absorbing and heat-retaining properties such, for example, as crude petroleum oil or like hydrocarbon oils. The oil storage container or reservoir 20 rests upon the bottom wall 14 of the housing, adjacent the side wall 16 thereof, and has an inlet 21 provided in the top wall thereof, and through which oil may be poured into the container 20.

The oil storage container 20 is preferably provided with a heat-insulating outer lining 22 which may be made of any suitable heat-insulating and non-combustible material such, for example, as asbestos or the like.

Attached to the oil storage container 20, adjacent the bottom thereof (Fig. 3), is an outlet pipe 23 and this pipe 23 communicates with a tubular heating coil 24 which is arranged in a casing 25, above a heating element which is shown as having the form of an electrical heating element 26.

The heating unit embodied in the new portable heating apparatus includes, in addition to the heating coil 24 and the heating element 26, a plurality of radially arranged and vertically extending tubes 27 which communicate at their lower ends with the heating coil 24 and at their upper ends these tubes 27 lead into a dome-shaped chamber 28. The casing 25 is attached to the dome-shaped hood 28, as shown in Fig. 3, and is provided with a ventilating outlet or chimney 29 which may be closed by means of a suitable closure cap (not shown) when the heating element 26 is in the form of an electrical heating element, or which may be allowed to remain open (as shown) when the heating element 26 is in the form of a gas heater which may be employed in place of the electrical heating element 26, if desired.

A vertically extending pipe 30 leads from the dome-shaped chamber 28 of the heating unit and this pipe 30 communicates with a pipe 31 which, in turn, leads into the upper area of the oil storage container 20.

The upper area of the oil storage container 20 is provided with an outlet 32 and a pipe 33 leads from this outlet 32 into the inlet side of a pump 34. The pump 34 is arranged upon a supporting base or pedestal 35 which, in turn, rests upon the bottom wall 14 of the housing as shown in Fig. 4. The pump 34 is operatively connected, by means of a shaft 35, with an electric motor 36 and this motor 36 rests upon a supporting base 37 which, in turn, rests upon the bottom wall 14 of the housing (Fig. 4). Operatively connected to and driven by the motor 36 is a fan 38 and this fan 38 is arranged in the housing 11 rearwardly of a heat-radiating unit 39 which includes a heat-radiating grille 40. The heat-radiating unit 39 includes a frame or casing 41 having a flanged portion 42 and this flanged portion 42 of the casing 41 is mounted in an opening 43 which is provided therefor in the front wall 12 of the housing 11, the casing 41 of the heat-radiating unit 39 being open at the front thereof as indicated at 44 (Fig. 7). The casing 41 of the heat-radiating unit 39 includes a circulating chamber 45 (Fig. 7).

A pipe 46 leads from the outlet side of the pump 34 into the circulating chamber 45 of the heat-radiating unit 39 and an outlet pipe 47 leads from the lower portion of the chamber 44 into the lower portion of the oil storage container 20, as shown in Figs. 2 and 4.

As shown in Fig. 8, the electric heating element 26 of the heating unit embodied in the new portable heating apparatus is arranged in an electrical circuit 48. The circuit 48 includes a conventional thermostatic control device 49, which is shown as being of the bi-metallic type, and this temperature control device 49 is preferably mounted upon the oil storage container 20, in contact with the metallic wall thereof, and so as to be directly responsive to the temperature of the oil in the oil storage container 20.

As also shown in Fig. 8, the electric operating motor 36 is arranged in an electrical circuit 50 which includes a conventional thermostatic or temperature responsive control device 51, which is shown as being of the bi-metallic type, and this thermostatic control device 51 is preferably arranged at a suitable point in the area or room in which the new portable heating apparatus is to be arranged and which is to be heated thereby.

In the use of the new portable heating apparatus, a suitable relatively heavy oil such, for example, as crude petroleum or furnace oil, may be poured into the oil storage container 20 through the inlet 21. Oil will then flow, by gravity, into the tubular coil 24 and the tubes 27 of the heating unit.

When the oil storage container 20 has been filled with oil, the electric heating unit 26 and the operating motor 36 may be set in operation, by suitable separate and independent manual switch controls therefor, (not shown), whereupon oil in the heating coil 24 and associated tubes 27 may be heated, to temperatures up to about 500° F., by the electric heating element 26 and the pump 34 and fan 38 will be driven by the motor 36.

During this operation the relatively lighter and heated oil will flow, by convection, from the heating unit 24—27—28 by way of the pipe 30—31 into the upper area of the reservoir 20. The pump 34 will then draw the thus heated oil from the upper area of the oil storage container 20, by way of the pipe 33, into the inlet side of the pump 34, whereupon the heated oil will flow through the pump 34 and thence out of the pump 34 through the outlet pipe 46 into the upper area of the circulating chamber 45 of the heat-radiating unit 39, and thence through the grille 40. During this operation heated air will flow, driven by the fan 38, from the grille 40 through the opening 44 into the area or room in which the new portable heating apparatus is arranged and which is to be heated thereby.

After the oil or like fluid in the oil storage chamber 20 reaches a predetermined temperature, the temperature-responsive device 49 will open the circuit 48 to the electric heating element 26 and thus prevent further heating of the oil in the apparatus.

Likewise, when the temperature of the room or area in which the new portable heating apparatus is arranged, and which is to be heated thereby, reaches a predetermined temperature, the thermostatic control or temperature-responsive device 51 will operate to open the circuit 50 to the electric motor 36, thus shutting off the operation of the motor 36 and the pump 34 and the fan 38.

It will be noted, in this connection, however, that the oil in the container or reservoir 20 when once heated will retain its heat for a substantial length of time after the temperature-responsive device 49 has opened the electric circuit 48 to the electric heating element 26.

It will thus be seen from the foregoing description, considered in conjunction with the accompanying drawings, that the new portable heating apparatus accomplishes its intended objects, and has the desirable advantages and characteristics, including those hereinbefore pointed out and others which are inherent in the invention.

I claim:

A portable heating apparatus comprising a relatively small portable housing including a wall provided with an opening to the atmosphere and said housing having the following parts arranged therein and the said portable heating apparatus including the combination of: a liquid storage container or reservoir; a heating unit; means for conducting relatively cool heat-conducting liquid from the lower portion of the said storage container to the said heating unit; means for conducting heated liquid by convection from the said heating unit into the upper area of said storage container; a heat-radiating unit; liquid circulating means including a pump for withdrawing heated liquid from the upper area of said storage container and forcing the same into the said heat-radiating unit; and means for operating the said pump; said heating unit including a tubular heating element and the said liquid circulating means including a pipe leading from the upper area of the said storage container into the inlet side of the said pump; an electrical circuit including an electrical heating element arranged below the said tubular heating element and temperature-responsive control device responsive to the temperature of the liquid in the said storage container; said portable heating apparatus also including a second electrical circuit including a temperature-responsive control device responsive to the temperature of the air in the area in which the said portable heating apparatus is arranged and which is to be heated thereby; said heat-radiating unit including a casing providing a heated liquid circulating chamber and said heat-radiating unit including a heat-radiating grille mounted in the said opening in the said wall of the said housing; said liquid circulating means including a pipe leading from the outlet side of the said pump into the upper portion of the said heated liquid circulating chamber and the said liquid circulating means including another pipe leading from the lower portion of the said heated liquid circulating chamber into the lower area of the said liquid storage container whereby in the use of said portable heating apparatus relatively cool heat-conducting liquid will flow by gravity from the lower portion of the said storage container into the said tubular heating element and heated liquid will flow by convection from the upper portion of the said tubular heating element into the upper area of the said storage container and heated liquid will be withdrawn by said pump from the upper area of the said storage container and will be forced thereby into the upper area of the said heated liquid circulating chamber in the said heat-radiating unit from which the said heat-conducting liquid will flow back into the lower area of said storage container for return to said heating unit.

FERDINAND A. GILL.